Dec. 15, 1953   J. M. PESTARINI   2,662,999
ELECTRIC MOTOR OF THE METADYNE TYPE
Filed Nov. 4, 1946

INVENTOR
Joseph M. Pestarini
BY
Philip S. Hilbert
ATTORNEY

Patented Dec. 15, 1953

2,662,999

UNITED STATES PATENT OFFICE 2,662,999

ELECTRIC MOTOR OF THE METADYNE TYPE

Joseph Maximus Pestarini, Staten Island, N. Y.

Application November 4, 1946, Serial No. 707,699

6 Claims. (Cl. 318—327)

This invention relates to direct current motors of the metadyne type.

An object of this invention is to provide a motor metadyne which is adapted to be energized from a source of constant current or from a source of constant voltage.

Another object of this invention is to provide a motor metadyne having improved torque-speed characteristics.

A further object of this invention is to provide a motor metadyne adapted to withstand sudden changes in the line voltage or power current.

Other objects of this invention will be in part obvious and in part hereinafter pointed out.

Figure 1:
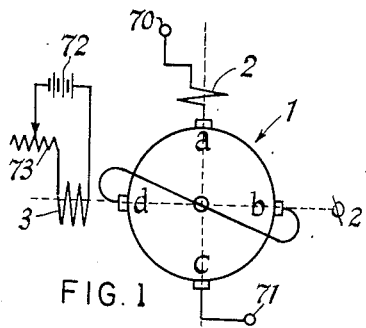
Figure 3:
Figure 4:
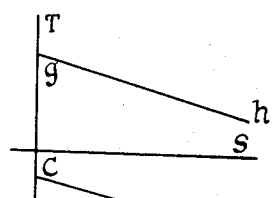
Figure 2:
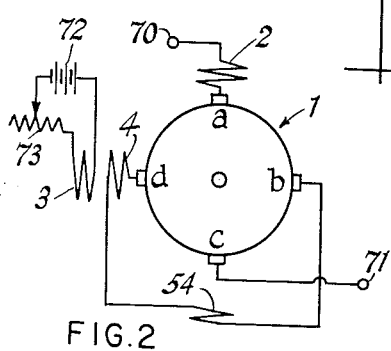
Figure 6:
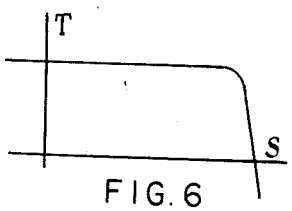
Figure 7:
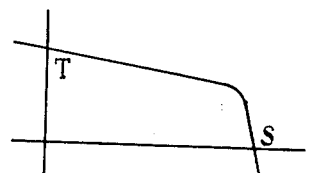
Figure 8:
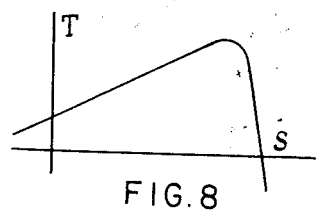
Figure 5:
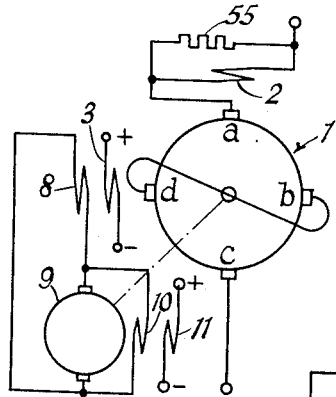
Figure 9:
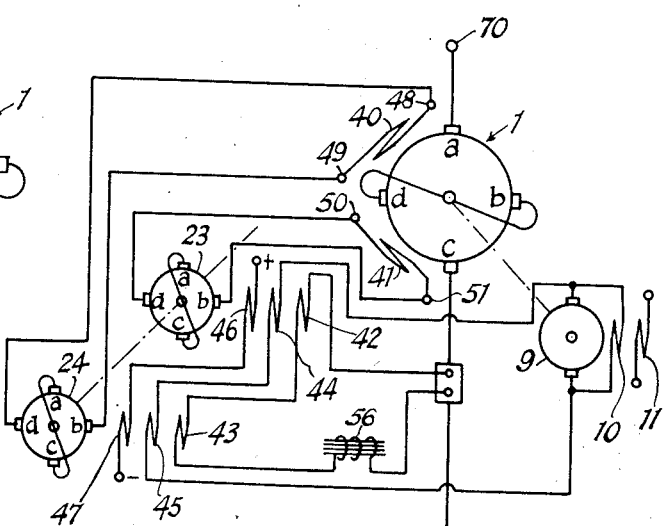

In the drawings, Fig. 1 shows the connections of a motor metadyne embodying the invention; Fig. 2 shows a modified form thereof; Figs. 3 and 4 show diagrams illustrating the operational characteristics of motor metadynes embodying the invention; Fig. 5 shows the connections between a motor metadyne and a speed regulator dynamo; Figs. 6, 7 and 8 show diagrams further illustrating the operational characteristics of motor metadynes embodying the invention; and Fig. 9 shows a motor metadyne arranged to have its stator windings energized by amplifier metadynes.

Referring in detail to the drawings and particularly to Fig. 1, $1$ designates a dynamo machine embodying the invention. The same comprises an armature having associated therewith a pair of primary brushes $a$, $c$ and a pair of secondary brushes $b$, $d$ which are displaced with respect to the primary brushes.

Terminals $70$, $71$, which are connected to the primary brushes $a$, $c$, respectively, are adapted to be connected to a source of constant current or to a constant voltage line. The machine $1$ further includes a stator winding $2$ which is located so that its magnetic axis, indicated by dotted line $\phi_1$, is coincident with the commutating axis of the primary brushes $a$, $c$. The winding $2$ is connected in series with brush $a$ and compensates partially or completely, the primary armature ampere turns due to the current traversing the primary brushes. The secondary brushes $b$, $d$, are short circuited.

The machine $1$ further includes a stator winding $3$ located with its magnetic axis, indicated by the dotted line $\phi_2$, coincident with the commutating axis of the secondary brushes $b$, $d$. The winding $3$ is energized from a direct current source $72$, regulated by rheostat $73$.

Thus, if the machine $1$ is connected through its terminals, to a constant current source and if the ampere turns created by the stator winding $3$ are constant, and if the compensation of the ampere turns created by the primary current is 100%, then the torque-speed characteristic of such a machine may be represented by the curve $am$ shown in the diagram of Fig. 3, where the moment of the torque $T$ is plotted against the speed $s$.

If the compensation is less than 100%, a condition which may be referred to as hypo-compensation, the torque speed characteristic of the machine may be represented by the upwardly inclined curve $ab$ in the diagram of Fig. 3, thus showing an increase of the torque with an increase in speed.

If the compensation is more than 100%, a condition which may be referred to as hyper-compensation, the torque speed characteristic of the machine may be represented by the downwardly inclined curve $gh$ in the diagram of Fig. 4, where torque $T$ is again plotted against speed $s$. The torque at zero speed is due exclusively to the action of the ampere turns of the stator winding $3$. Thus, the ordinate of the intersection of the torque-speed curve with the axis of the ordinate, may be modified by regulating the ampere turns of the winding $3$. For example, if the ampere turns are inverted, the resultant curve will be represented as $cd$ in Fig. 4, which would involve a change from acceleration to braking and the machine would then operate as a generator.

The operation of an under compensated machine which is connected to a constant voltage line, is equivalent to the operation of a dynamo provided with a compound field excitation comprising a shunt field winding and a series field winding creating ampere turns in the same direction.

If the machine is overcompensated, the shunt and series field windings of the equivalent dynamo create ampere turns in the opposite directions.

In Fig. 2 is shown a machine $1$ which is similar to that described in Fig. 1, together with provision for permitting a simple setting of the value of the secondary current. At times it may be difficult to regulate the degree of compensation of the primary armature ampere turns so as to obtain the proper value of the secondary current. However, the secondary current may be modified by regulation of the characteristics of the secondary circuit. To this end, the machine $1$ further includes two series connected stator windings $4$, $54$, which are connected across the secondary brushes $b$, $d$ of the machine. Winding $54$ is located to produce an electromotive force between the secondary brushes $b$, $d$ in opposition to the secondary current. Winding 4 creates ampere turns in the same direction as the secondary armature ampere turns. The winding 54 modifies the value of the secondary current for a given primary flux while the winding 4 modifies the component of the secondary flux due to the secondary current.

The stator windings 4, 54 must necessarily have a low resistance in order to permit the resultant flux in the direction of the primary commutating axis to create a substantial secondary current in the secondary circuit. Accordingly, the secondary brushes $b$, $d$ are substantially short circuited.

It is desirable that the motor torque shall vary slightly with the speed between rest and a speed approaching an arbitrarily defined speed, whereas the motor torque should vary rapidly with slight changes of speed in the neighborhood of such arbitrarily defined speed. In such case, the motor is capable at or about such arbitrarily defined speed to develop any value of its torque within a given range of performance. With a zero torque, the corresponding speed is known as a zero torque speed.

Such a result may be obtained by the use of a stator winding 8, as shown in Fig. 5, for inducing an electromotive force between the primary brushes $a$, $c$ of machine 1. Such winding is traversed by a regulator current which varies rapidly with a slight change in speed in the neighborhood of the zero torque speed. Such a regulator current may be supplied from an auxiliary dynamo coupled to the shaft of the motor and operating at its building up speed immediately before the zero torque speed is reached. An auxiliary dynamo of this type may have the connections as described in Patent 1,962,030.

Fig. 5 shows such a regulator dynamo 9 which is shunt excited by winding 10. The stator winding 8 is connected directly across the brushes of dynamo 9. The dynamo 9 also includes an independently excited field winding 11 which creates a reduced value of constant ampere turns in order to bias the direction of the current in winding 8 as it builds up. The zero torque speed may be readily adjusted by suitably regulating the resistance of the excitation circuit including winding 10.

It is understood that the regulator current for stator winding 8 may be provided by other suitable means, as for example, by a series excited dynamo, a shunt excited dynamo connected to a substantially constant voltage source or by a series excited dynamo connected to a substantially constant voltage source.

When primary winding 2 provides a flux less than that of the primary armature current, in which case the winding may be referred to as a hypo-compensating winding, an increase in the primary current gives rise to an increase in the counter electromotive force and thus insures overall stability of operation.

If it is desired that there shall be a constant torque at low speeds and a rapid variation in torque only in the neighborhood of the zero torque speed, as indicated in the curve shown in Fig. 6, then the compensating winding must completely compensate the flux derived from the primary armature current. In such case, stability of operation is obtained, although somewhat lesser in degree. This is due to the fact that the flux due to the primary armature ampere turns varies rapidly with a change in the primary current while the flux due to the compensating winding is somewhat sluggish in response to a change in the primary current. This effect is strong enough to be operative even with a slightly over compensating winding.

In order to increase this effect on the stability of operation, the rapidly varying current in winding 2 may be diverted by the use of well known circuit devices, such as a resistor 55 connected across the winding, as shown in Fig. 5.

Fig. 7 shows a torque speed curve when winding 2 is under compensating in operation, while Fig. 8 shows a torque speed curve when the winding is over compensating in operation.

The multiple stator windings of the motor metadyne embodying the invention, may be replaced by single windings having corresponding magnetic axes with the replaced windings and energized by dynamo electric machines known as amplifier metadynes which create in the single winding the equivalent ampere turns which were produced by the combination of replaced windings. For such purpose, the amplifier metadyne is provided with as many secondary stator windings as are necessary to function in the same manner as the replaced windings. The amplifier metadyne is fully described in Patent 2,112,604 and British Patent 420,167.

Thus, Fig. 9 shows an arrangement similar to that of Fig. 5 except as hereinafter pointed out. The stator windings 2, 3 and 8 of machine 1, as shown in Fig. 5, may each comprise a series of interconnected coils with each coil interlinked with one of the polar segments of the machine. Accordingly, each polar segment will bear three separate coils. However, the three separate coils may be replaced by a single coil which is traversed by a controlled current supplied by the above mentioned amplifier metadyne. As the polar segments which are displaced 180 electrical degrees are excited by the same number of ampere turns at any given time, the single coils on such pair of displaced polar segments may be energized from the same amplifier metadyne.

Accordingly, as shown in Fig. 9, the motor metadyne 1 includes stator windings 40, 41. Winding 40 is energized through its terminals 48, 49 by an amplifier metadyne 24, while winding 41 is energized through its terminals 50, 51 by an amplifier metadyne 23 which is coupled to amplifier metadyne 24. The amplifier metadynes 23, 24 are adapted to be rotated by suitable means, not shown. Amplifier metadyne 23 includes control stator windings 42, 44 and 46 while amplifier metadyne 24 includes control stator windings 43, 45 and 47.

The windings 46, 47 are series connected and independently excited. These windings are effective to control the output of amplifier metadynes 23, 24 so as to create in windings 40, 41 of machine 1, the effect equivalent to that produced by winding 3, as shown in Fig. 5. Windings 44, 45 are also series connected and energized by a regulator dynamo 9 coupled to machine 1 and thus provides in windings 40, 41, the effect of winding 8, as shown in Fig. 5. Finally, windings 42, 43 are series connected and energized by a current proportional to the primary current of machine 1 and provided by a shunt 77 inserted in the primary brush circuit of machine 1, thus giving the effect of winding 2.

In order to increase the magnetic impedance of the circuit including windings 42, 43 and to substantially reduce the transient currents traversing said windings, a reactance 56 is series connected with the windings. Thus, reactance 56 has an effect similar to that of resistor 55 shown in Fig. 5.

As various possible embodiments may be made of the above described invention, and as various changes might be made in the embodiments set forth, it is to be understood that all matter herein set forth or shown in the drawings is to be interpreted as illustrative and not in a limiting sense.

What I claim is:

1. An electric system comprising a direct current source, a motor metadyne comprising two non-consecutive primary brushes per cycle connected to said direct current source, two secondary brushes per cycle substantially short circuited and a plurality of stator windings, means for supplying one of said stator windings with a current proportional to the primary current of said motor metadyne and creating a flux component having its magnetic axis coincident with the primary commutating axis of said motor metadyne and opposing and less than the flux created by the primary armature ampere turns, means for regulating the value of the current in said stator winding, means for supplying a controlled current to another stator winding for creating a flux component having its magnetic axis coincident with the secondary commutating axis of said motor metadyne, a speed regulator dynamo coupled to said motor metadyne for supplying current to another stator winding of said motor metadyne for creating a flux component having its magnetic axis coincident with the secondary commutating axis of said motor metadyne, whereby said motor metadyne is adapted to start and to develop a torque which varies abruptly substantially at the critical speed of said regulator dynamo.

2. An electric system comprising a direct current source, a motor metadyne comprising a plurality of stator windings, an armature having two non-consecutive primary brushes per cycle connected to said direct current source, two secondary brushes per cycle, said secondary brushes being substantially short circuited through at least one of said stator windings, another of said stator windings having less ampere turns than the ampere turns of said armature and being adapted to be traversed by a current proportional to the primary current of said motor metadyne and creating a flux component having its magnetic axis coincident with the primary commutating axis of said motor metadyne and opposing and less than the flux created by the primary armature ampere turns, another stator winding adapted to create a flux component having its magnetic axis coincident with the secondary commutating axis of said motor metadyne, means for supplying a controlled current to said last mentioned stator winding, the stator windings short circuiting the secondary brushes creating a flux proportional to and in the same direction as the flux created by the secondary armature ampere turns and further creating a flux proportional to the secondary current and inducing an electromotive force between the secondary brushes opposing said secondary current.

3. An electric system comprising a direct current source, a motor metadyne including an armature having a pair of primary brushes connected to said direct current source, a pair of short circuited secondary brushes displaced therefrom, and a plurality of stator windings, one of said windings having its magnetic axis coincident with the commutating axis of said primary brushes and series connected with one of said primary brushes, said one winding having less ampere turns than the ampere turns of said armature whereby to provide a flux proportional to the primary current and in the opposite direction to and less than the flux created by the primary armature ampere turns, another of said stator windings having its magnetic axis coincident with the commutating axis of said secondary brushes, and means for independently energizing said last mentioned stator winding for creating an arbitrary flux and inducing an electromotive force between said primary brushes.

4. An electric system as in claim 3 and further including means in circuit with said first mentioned stator winding for determining the value of the current traversing said winding.

5. An electric system comprising a direct current source, a motor metadyne including an armature having a pair of primary brushes connected to said direct current source, a pair of short circuited secondary brushes displaced therefrom and a plurality of stator windings, an amplifier metadyne having its output connected to one of said stator windings, said amplifier metadyne including a first control winding in circuit with one primary brush and operative to provide in such stator winding a flux component proportional to the primary current of said motor metadyne and in the opposite direction to and less than the flux created by the primary armature ampere turns and a second control winding operative to provide in said stator winding a second flux component in the direction of the secondary commutating axis of said motor metadyne and having an arbitrary value.

6. An electric system as in claim 5 and further including a regulator dynamo coupled to said motor metadyne and having its output connected in circuit with a third control winding of said amplifier metadyne whereby to create in said one stator winding a third flux component having its magnetic axis coincident with the secondary commutating axis of said motor metadyne and proportional to the output of said regulator dynamo.

JOSEPH MAXIMUS PESTARINI.

References Cited in the file of this patent

UNITED STATES PATENTS

| Number | Name | Date |
|---|---|---|
| 1,389,110 | Wilson | Aug. 30, 1921 |
| 1,945,447 | Pestarini | Jan. 30, 1934 |
| 2,227,992 | Alexanderson et al. | Jan. 7, 1941 |
| 2,454,581 | Thomas | Nov. 23, 1948 |